United States Patent
Verhoeven et al.

[11] Patent Number: 6,109,563
[45] Date of Patent: Aug. 29, 2000

[54] PLUG DOOR OPERATING MECHANISM

[75] Inventors: Teunes Verhoeven, Long Beach; Wilfred E. Boehringer, Fullerton; William V. Mutz, Long Beach; Terry J. Beezhold, Bellflower, all of Calif.

[73] Assignee: McDonnell Douglas Corporation, Long Beach, Calif.

[21] Appl. No.: 08/738,946

[22] Filed: Oct. 24, 1996

Related U.S. Application Data

[60] Provisional application No. 60/024,229, Sep. 30, 1996.

[51] Int. Cl.$^7$ ........................................................ B64C 1/14
[52] U.S. Cl. ..................................... 244/129.5; 244/137.2
[58] Field of Search ............................. 244/129.4, 129.5, 244/137.1, 137.2

[56] References Cited

U.S. PATENT DOCUMENTS

| | | |
|---|---|---|
| 2,301,950 | 11/1942 | Hulse . |
| 3,585,757 | 6/1971 | Ritchie et al. ........................ 244/129.5 |
| 3,802,125 | 4/1974 | Baker . |
| 3,844,062 | 10/1974 | Daugirdas . |
| 4,047,441 | 9/1977 | Kellogg . |
| 4,125,235 | 11/1978 | Fitzgerald ............................. 244/129.5 |
| 4,470,566 | 9/1984 | Fitzgerald ............................. 244/129.5 |
| 4,580,365 | 4/1986 | Seig . |
| 4,787,577 | 11/1988 | Whittle .............................. 244/129.5 X |
| 5,064,147 | 11/1991 | Noble .................................... 244/129.5 |
| 5,181,677 | 1/1993 | Kaplan et al. . |
| 5,305,969 | 4/1994 | Odell .................................... 244/129.5 |
| 5,540,404 | 7/1996 | Battenfield ........................... 244/129.5 |

FOREIGN PATENT DOCUMENTS

| | | |
|---|---|---|
| 182-003 | 1/1980 | U.S.S.R. . |
| WO 91/15398 | 4/1991 | WIPO . |

*Primary Examiner*—William Grant
*Attorney, Agent, or Firm*—Alston & Bird LLP

[57] ABSTRACT

The present invention provides a door operating system for opening and closing a door covering an exit opening of an aircraft. More particularly, the present invention provides a door operating system for opening and closing a plug type door typically located on the lower passenger deck of an aircraft. The door operating system includes a frame that is connected to the door of the aircraft and defines a pivot for the door. Connected to the frame is a torque drum and linkage system. The door operating system also includes a motor and a cable drum attached to the opposite end of the track. A cable is connected to the cable drum, the torque drum, and the frame. When opening the door, the motor turns the cable drum, which thereby pulls the cable. The cable rotates the drive torque drum and causes the door to be rotated about the pivot thereby moving the door upwardly and inwardly away from the exit opening. After the door has moved away from the exit opening, the cable pulls the frame such that the frame slides along the track and is moved lengthwise with respect to the aircraft away from the exit opening. To close the door, the above operations are reversed. As an aid to opening and closing the door, the door operating system also includes an interlock system that prevents the door from being moved lengthwise along the track until the door has been fully rotated upwardly and inwardly by the torque drum.

25 Claims, 8 Drawing Sheets

PLUG DOOR OPERATING MECHANISM

RELATED APPLICATIONS

This application claims priority from U.S. Provisional Patent Application Ser. No. 60/024,229 filed on Sep. 30, 1996, the contents of which are incorporated in their entirety herein.

BACKGROUND OF THE INVENTION

1. Field of the invention

The field of this invention relates to aircraft door operating mechanisms which permit the opening of aircraft doors. More particularly, this invention relates to powered aircraft door operating mechanisms which open doors on the lower curved section of aircraft, which may be operated from both inside and outside of the aircraft and which permit either powered or manual operation thereof by utilizing aircraft electrical power or stored mechanical energy.

2. Related Art

There are many types of doors used on transport aircraft. Such doors are sized for various applications and their functional requirements vary. Most doors fall into the following groupings: passenger doors, cargo doors, or maintenance access doors. Passenger doors are typically on the upper section of an airplane fuselage while cargo and access doors are on the lower section. Each type of door has some special requirements.

On certain large or jumbo aircraft, there may be a passenger deck on the lower portion of the fuselage, forward of the wing. This is called the panorama deck configuration and provides for at least two passenger doors, one on each side of the aircraft.

In addition to curving inward at the bottom, passenger access doors on the lower side of the aircraft have many unique requirements. In addition to the normal opening, closing and emergency opening operations such doors must also be a plug type door that opens inward to provide clearance for the galley service equipment and be operable only by human effort. The door must also be capable of withstanding ditching loads, that is it must have a locking capability which withstands external water pressure loads.

Such doors must have powered open and closing capability while permitting opening in emergency situations when aircraft supplied central power systems may be disabled. In addition, automatic slide deployment in the emergency opening mode must also be incorporated.

For example upper deck doors in use today move inward and slide aft on an upper track and a lower track. This door is without power assist and is operated entirely with human effort. Due to panorama deck door configuration constraints and operating requirements such a system is not useable on panorama deck plug type access doors which must open inward, move upward and then slide forward to avoid intrusion on passenger space or interference with the exit size.

BRIEF DESCRIPTION OF THE INVENTION

The instant invention provides a plug type passenger access door which uses a single electrical motor to unlock and open, or close and lock the door. Spring energy is stored and used to open the door and deploy the slide in emergency situations. In addition a hand crank is provided which can be used to open or close the door for maintenance purposes.

The access door is curved inward at the bottom as indicated above and rests on jam stops when in the closed position. The slide pack is integral to the door as is known in the art. During flight, aircraft pressurization loads hold the door against the stops.

The door is provided with a single control mechanism for automatically opening or closing the door. In non-flight modes, when the door is to be opened, the control mechanism is activated and the electrical motor moves a mechanism to unlock the door, moves it inboard and upwards. The mechanism then slides the door forward on a track to position it out of the exit opening. When the door is to be closed, the control mechanism is again activated and the electric motor slides the door aft on the track and when the door is positioned in front of the exit opening, moves downwards and outboard until the door rests against the stops on the door jam structure. The door drive mechanism continues to rotate until the door is in the locked position.

In emergency situations the operation to open and close the door is identical to the automatic mode except that a mechanical clock type spring, which is wound during automatic operation, is used to provide the energy required to move the door.

Additionally, a backup system is provided which also permits the opening and closing of the door in the absence of either electrical or mechanical backup power by utilizing a hand crank. Finally the door may be uncoupled from the drive mechanism and positioned by hand. However, when the door is positioned by hand the interlock mechanism does not operate and the door may not be locked or unlocked. This mode is usually necessary only for maintenance purposes. However, a separate lock and unlock lever mechanism may be provided to separately lock and unlock the door so that it can be moved by hand in emergency situations. Alternatively, an unlock feature can be incorporated into the mechanism which uncouples the drive mechanism so that the door can then be moved by hand.

Where necessary, releasable side consoles may be employed on the sides of the fiuselage so that they may be either rotated or otherwise moved out of the door path when movement by hand is required.

DESCRIPTION OF THE PREFERRED EMBODIMENT

Figure 1:
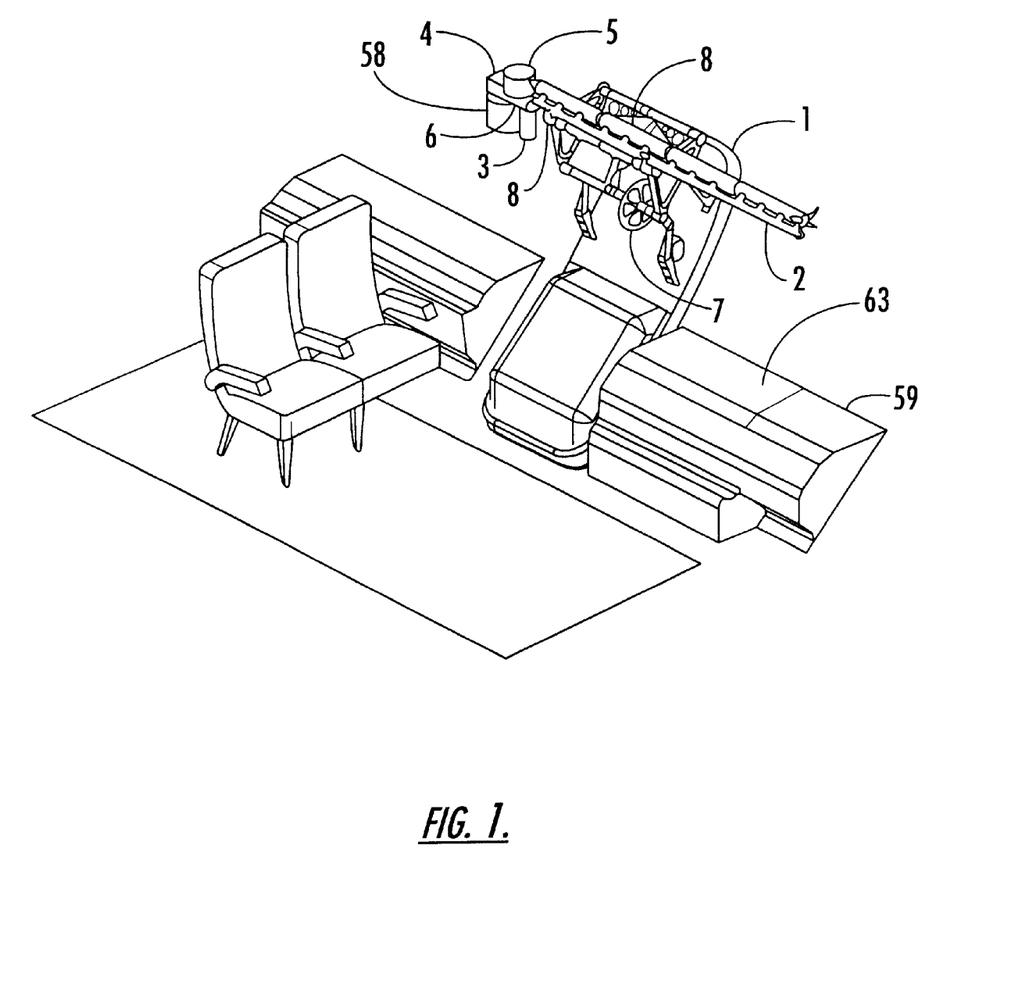
FIG. 1 is a perspective view of the door in a closed position.

Referring now to the drawings, FIG. 1 shows the plug type passenger access door 1 curved inward at the bottom to conform to the lower curvature of the fuselage. The door 1 is hung from a track 2 by a carriage 8 which permits the door 1 to slide laterally along the track 2 generally along longitudinal axs of the fuselage. The track 2 is supported by structural members in the ceiling not shown in FIG. 1. The power to move the door 1, and to unlock and open, or close and lock the door 1 as described hereafter, is provided by an electrical motor 3 which is mounted at one end of the track 2.

Figure 7:
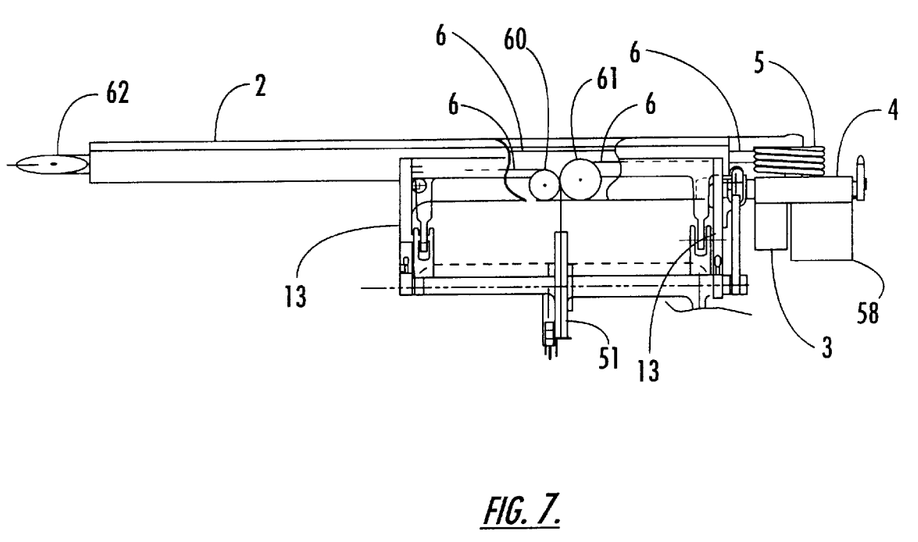
FIG. 7 is a side view of the cable routing.

Further with reference to FIG. 1, when closing the door 1, for example, the motor 3 drives a gear box 4. The output of the gear box 4 rotates a cable drum 5. A cable 6 is wound about the cable drum 5 and the cable 6 ends are attached to a door opening 7 apparatus attached to the door 1 and supported by the carriage 8. When the motor 3 is activated it winds the cable 6 around the drum on one side and unwinds the cable 6 on the other and moves the door opening apparatus along the track 2 in either direction. When opening the door the motor drive direction is reversed and the door moves laterally generally in the forward direction as shown in FIG. 1. Routing of the drive cable 6 may be through the track 2 with routing through appropriate cable guides, as shown in FIG. 7. FIG. 7 shows a sample cable routing along the track 2. This routing is facilitated by routing the cable 6 through pulleys 60 and 61 positioned on the door frame directly above the interlock pulley 51. The cable 6 is wound about a pulley 62 at one end of the track 2 and the cable drum 5 at the other thereby permitting the motion by the driving mechanism as herein described. While a particular embodiment has been described other alternative routings for such cable 6 may be implemented and any suitable routing which permits the indicated motion and minimizes wear on the cable is considered within the scope of this invention and will be readily apparent to those skilled in the art.

Figure 2:
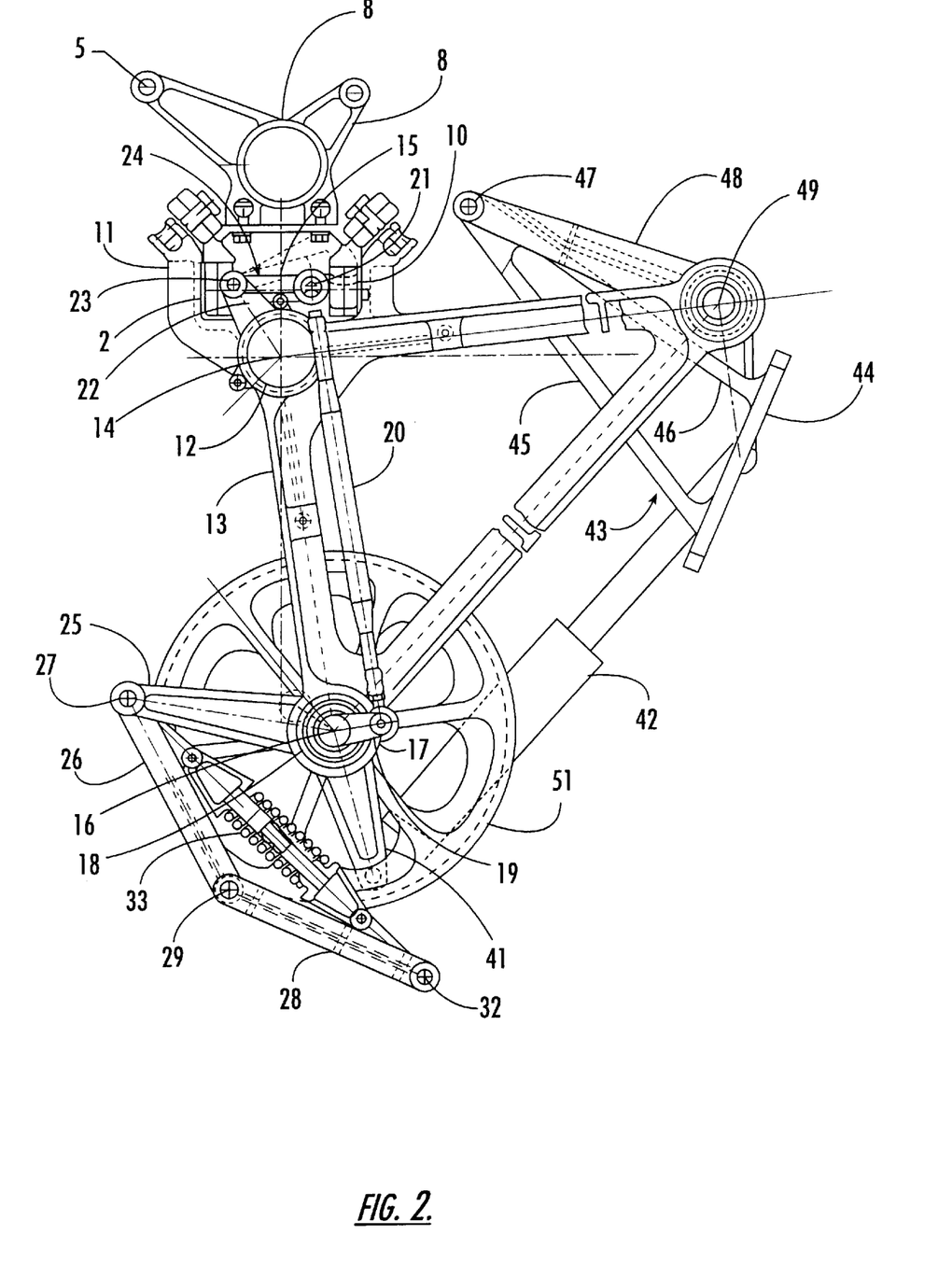
FIG. 2 is a side view of the triangular mount of door opener.
Figure 3A:
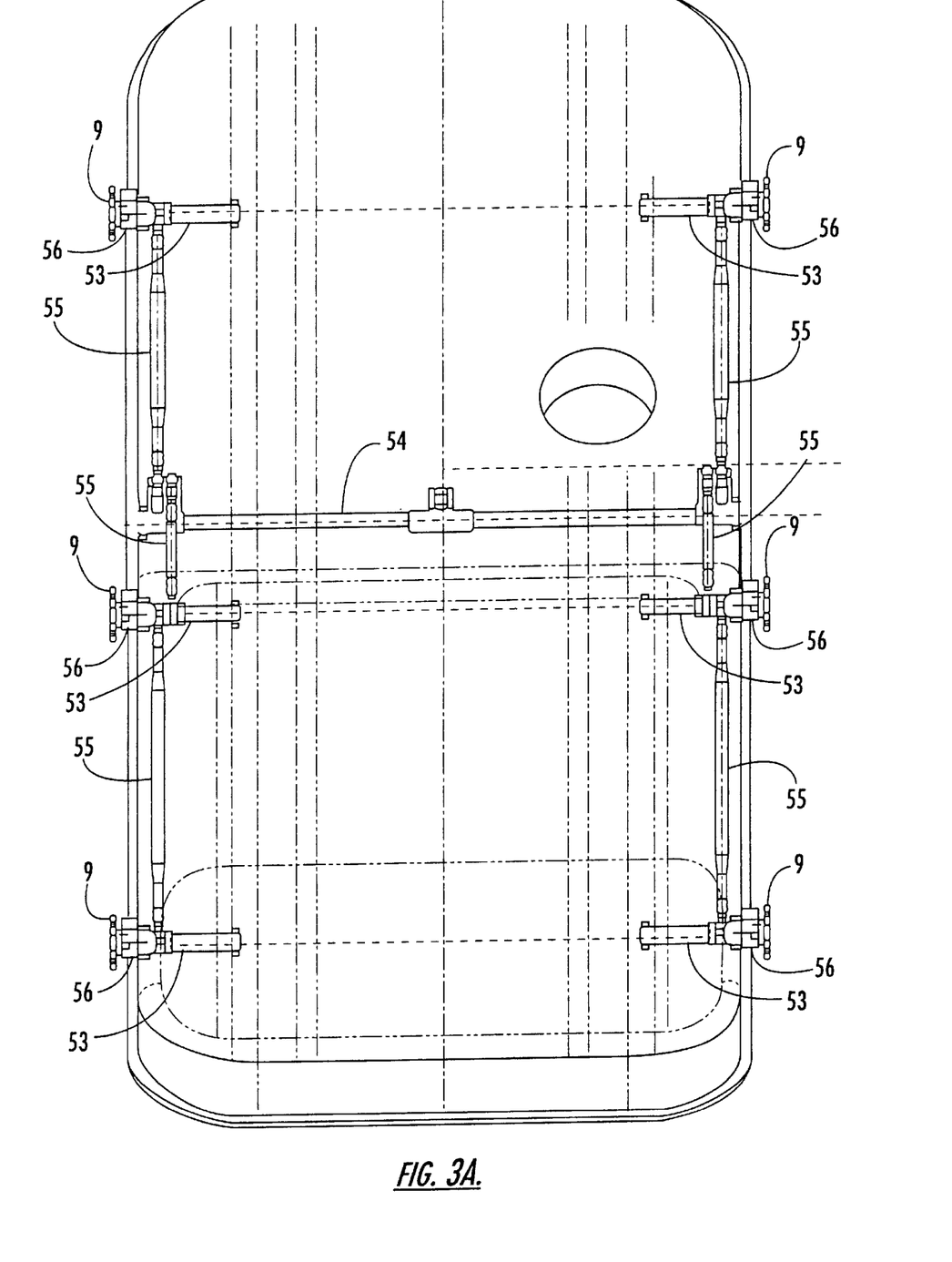
FIG. 3a–3c are views of the door closing mechanism.
Figure 3B:
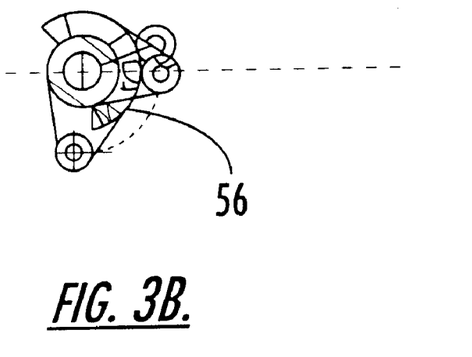
Figure 3C:
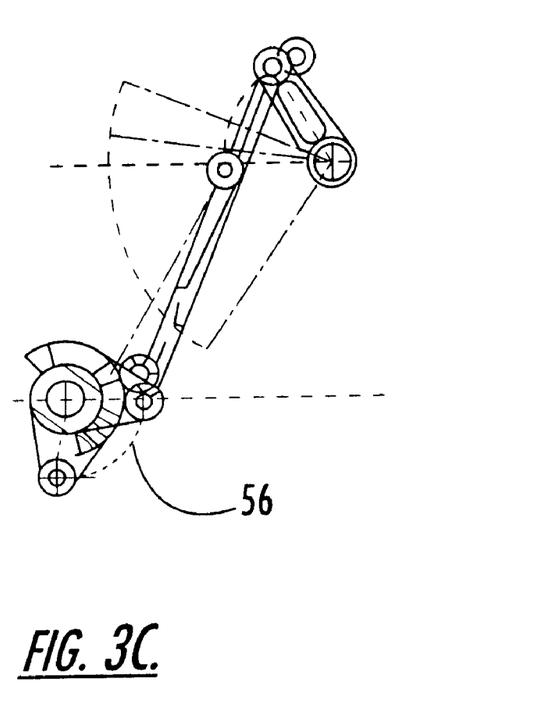
Figure 4:
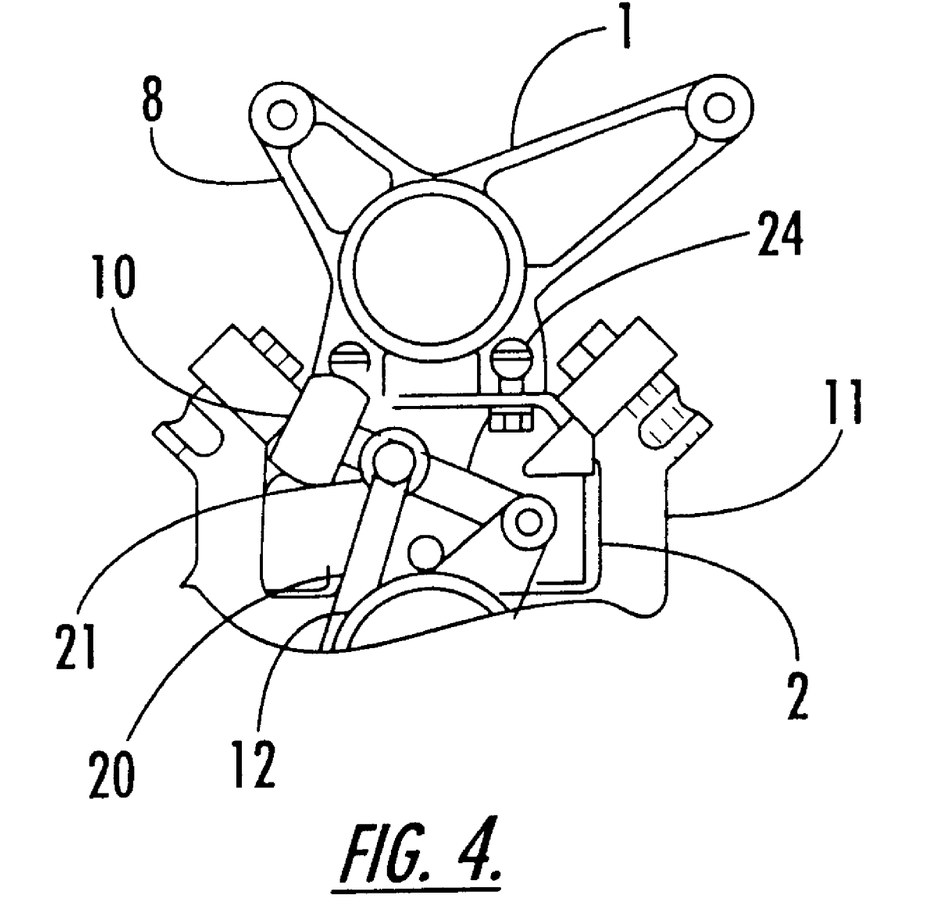
FIG. 4 is an end view showing the interlock roller positioned out of the track.

However, it will be noted, as shown in FIG. 3 that when the door I is in the closed position, it rests against stops 9 in the door jam and is locked in place. In such a position, the door 1 must first be unlocked and moved inboard and away from the exit opening prior to moving laterally. As shown in FIG. 2, when in the closed position, a carriage interlock roller 10 is positioned out of the track 2 (the dotted representation). This can be more clearly seen in FIG. 4. As long as the interlock roller 10 is positioned out of the track 2, the door opening apparatus cannot move laterally.

The cable 6 is attached to the door opening mechanism which is moved by the cable 6 when the roller 10 is in contact with the track 2. The carriage 8 further includes a pair of triangular frames 13 which slidably engages the carriage 8. As shown in FIG. 2 the carriage 8 is engaged by a pair of generally U shaped brackets 11 fixedly attached to an elongated tube 12 which spaces the frames 13 and therefore the brackets 11 apart such that each of the brackets 11 is approximately adjacent the opposite edges of the door 1 which provides stability. In this specific embodiment, the U shaped brackets 11 are rotatably mounted to the elongated tube 12 at a first pivot point 14 generally at a first intersection of the sides of the triangular frames 13 through bearings, not shown. An interlock pivot arm 15 rotatably supports the interlock roller 10 at one end and is rotatably attached at a pivot point 23 at the other end to a interlock crank arm 22 fixedly attached to said one of said triangular members 13 at said first pivot point 14 such that the interlock roller 10 is capable of traveling inside the channel of said track 2.

Further in FIG. 2, a second intersection point 16 is formed by the intersection of the sides of said triangular member below the carriage 8. A second elongated tube 17 is mounted to said triangular members 13 between the respective intersection points 16 through ben 18 in each one of said pair of triangular members 13 at point 16. The tube 17 is fixedly attached to a first torque tube crank arm 19. A link 20 is rotatably mounted to the end of crank arm 19 and rotatably connected to a pivot point 21 on said interlock roller 1O mount 24. The moment arm defined by the distance of the pivot point 21 and the pivot point 23 of the interlock roller mount and the moment arm defined by the distance of the pivot point 21 and the centreali of the torque tube 17 need not be equal. In fact in this embodiment the moment so defined on the interlock rolier mount is greater.

A second torque tube crank arm 25 is fixedly mounted to said torque tube 17 and disposed generally in the opposite direction of said first crank arm 19. The second torque tube crank arm 25 is rotatably attached at its end to an interconnect link 26 at a pivot point 27. Interconnect fink 26 is rotatably attached to a first door lin 28 at a pivot point 29. The first door link 28 is rotatably attached at its opposite end to door articulated linkage 30, shown in FIG. 5, fastened to the door 1 at a pivot point 31. A spring loaded connector 33 (a bungee connector comprising two ends mounted on a movable guide with extension stops and a spring to form a unitary structure) is rotatably mounted between pivot points 27 and 32. This biases the two pivot points 27 and 32 toward one another. When fully extended, the spring loaded connector 33 is shorter in distance than the combined distances of the links 26 and 28 Thereby maitain a an angle of less than 180 degrees between the links so that motion between the links will remain below 180 degrees on the same side and will avoid binding.

Figure 5:
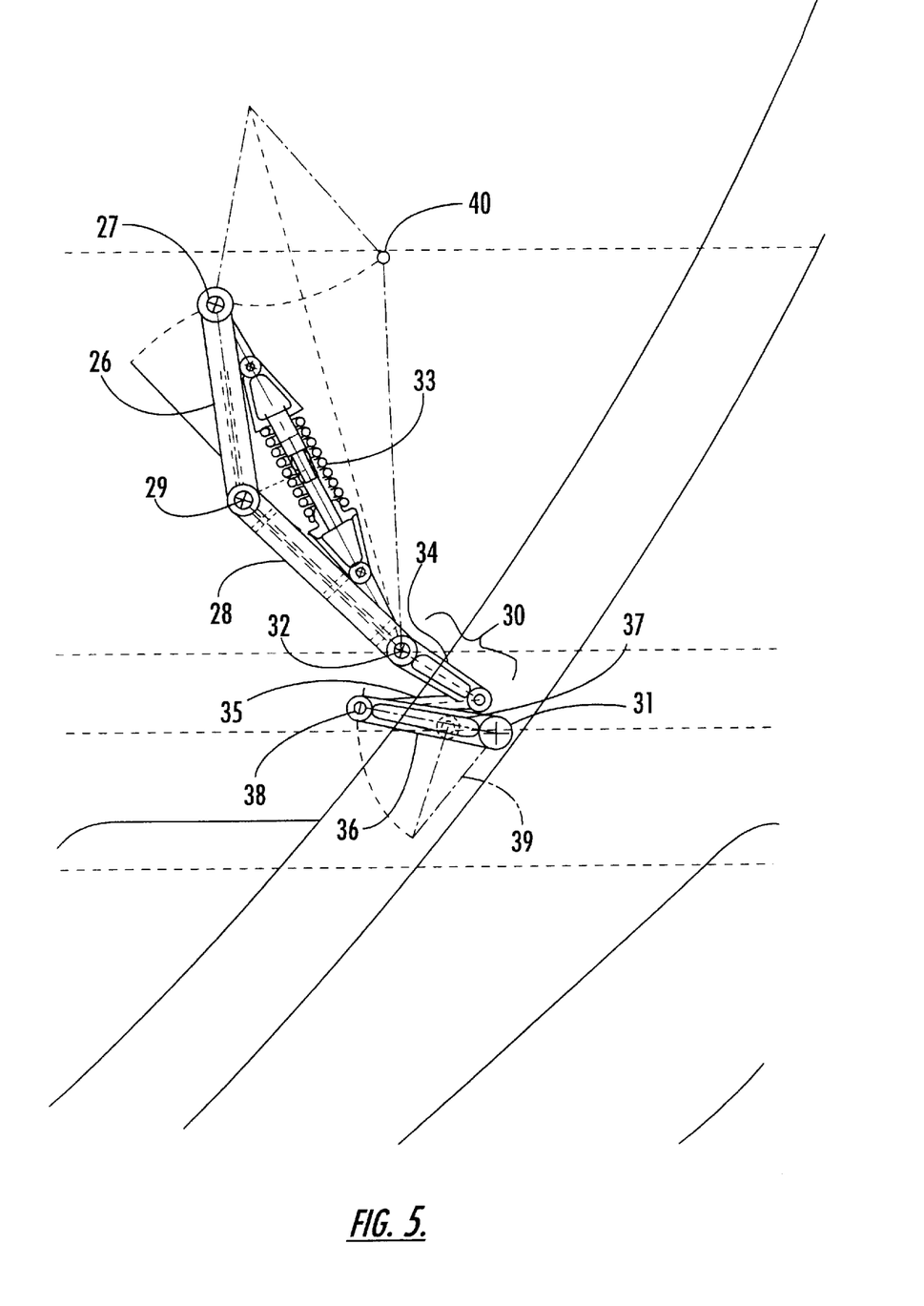
FIG. 5 is a side view of the door interlock linkage.
Figure 6:
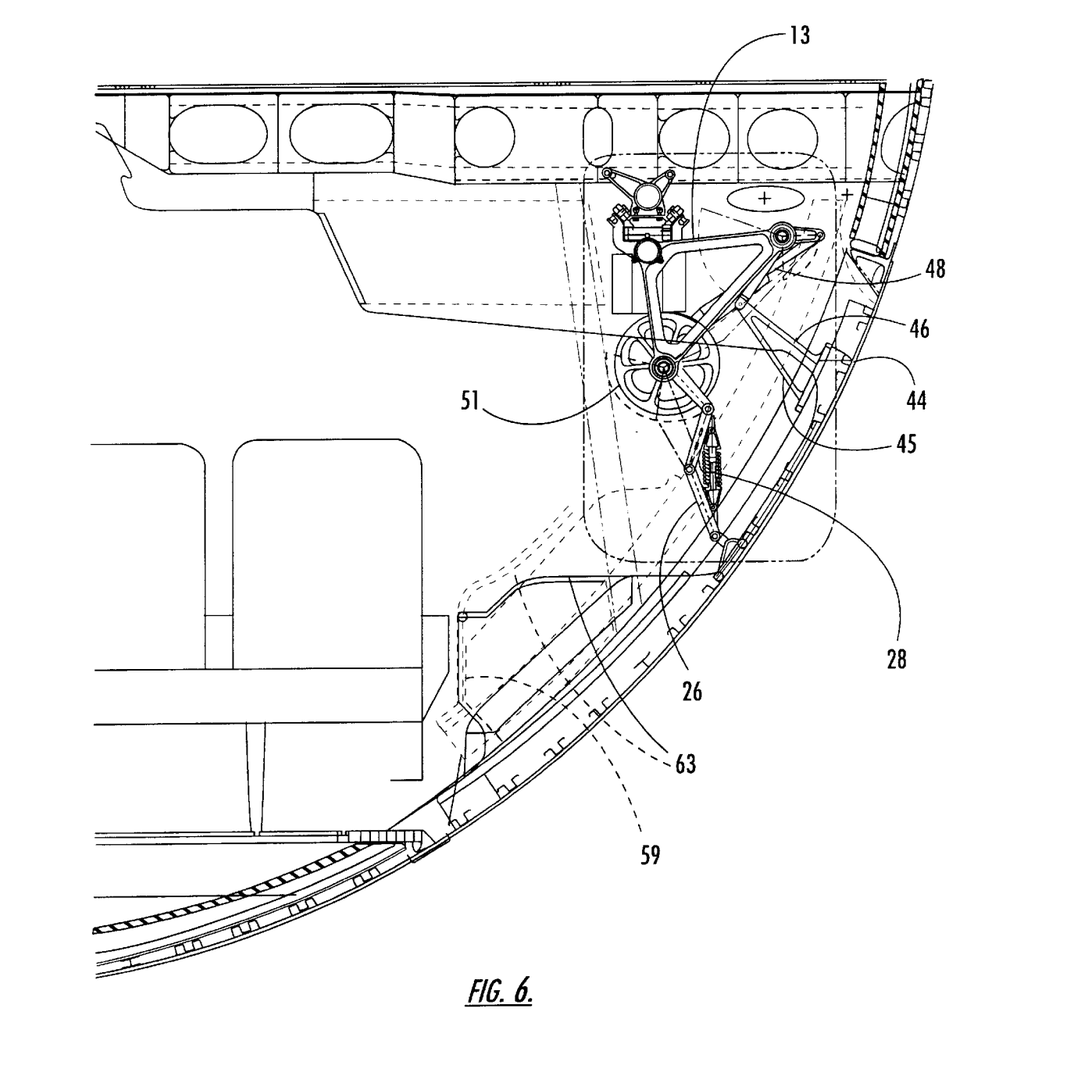
FIG. 6 is a side view of the door interlock linkage and the door in a closed position.

As shown in FIG. 5, the door articulate linkage 30 is formed by three swivel links 34, 35 and 36, each rotatably connected in series to the other. The first swivel link 34 is rotatably attached to door link 28 at pivot point 32 and to the second swivel link 35 at a pivot point 37. The second swivel link 35 is rotatably attached to the third swivel link 36 at a pivot point 38. The third swivel link is rotatably attached directly to the door 1 at a pivot point 31.

FIG. 5 shows the door 1 in an open position. When the door is closed the force on the articulated linkage causes pivot point 38 to move in an arc toward the door 1 and positions the link 36 generally parallel to the door as shown by dotted line 39. This occurs when the pivot point 27 is moved to point 40 as shown by the dotted lines as will be described further herein.

Again referring to FIG. 2, a third crank arm 41 mounted on the tube 17 is rotatably attached to a spring loaded cylinder 42. The spring loaded cylinder 42 is rotatably attached to a door mount 43 at the end opposite the crank arm 41. The door mount 43 is a generally triangular structure having a base 44 which engages door 1. Such base 44 supports two arms 45 and 46 which meet at the apex of the triangle at a pivot point 47 where it is rotatably attached to the end of a crank arm 48. Crank arm 48 is in turn attached at the third intersection point of triangular frame 13 pivot point 49. When the door is to be closed, the carriage interlock roller 10 is positioned under the track 2, the drive torque tube 17 cannot rotate. Motor 3 torque pulls the cable 6 in the aft direction and pulls the door along the track until the interlock roller 10 runs off of the end of the track 2. Once the interlock roller is free of the track 2 the interlock pulley 51 is free to rotate. The cable drive 6 now rotates the drive torque tube 17 and pushes the bungee (spring loaded) links 26, 28 and 33 and the door mount 43 in a downward direction causing the door to rotate about its mounting at the top and outboard to the door jam stops 9. Once the door reaches the stops, a compression link continues to be rotated by the motor 3 torque and cable 6 system. As seen in FIGS. 3a–3c, this motion rotates torque tub 54 which is coupled to push rods 55 attached to the six door locking latches 56. The locking latches 56 hook the door locking bars 53 and hold the door 1 in a fixed sealed position against the stops 9 and the door jamn and provide the air and water tight seal required to meet the ditching loads for the particular aircraft configuration.

In opening the door, the mechanism works in the reverse order. Rotation of the torque tube 54 in the opposite direction causes a movement of the push rods 55 and unlocks the six door locking latches 56. Further rotation of the interlock pulley 51 causes the door to move inboard and upwards. When the door reaches its maximum height, the carriage interlock roller 10 is aligned with the track 2 surface and the U shaped brackets 11 and triangular frames 13 with the door attached translates laterally along the track 2 until the door reaches open stops on the ceiling or wall of the passenger deck.

A handle or push button mechanism such as is currently used on aircraft doors is suitable for use with the instant invention as will be appreciated by those skilled in the art and is therefore not shown. A door arming handle which engages the glide girt bar during the in-flight mode and the emergency operating handle also, operate similar to those found on upper doors and are likewise not shown.

With reference to FIG. 1, in this invention when the arming handle is in the armed position, and the emergency handle is rotated to the emergency position, the cable drive drum 5 will rotate under spring generated energy from a clock type spring 58 mounted adjacent the electrical motor 3. The drive spring 58 then drives the door opening mechanism in the same sequence as in the normal mode. However, since the arming handle was in the armed position, the slide girt bar was engaged, the bar will pull the slide out of its container when the door moves laterally. Thus, when the door is completely open, the slide pack will fall out of the door opening and deploy as in the emergency mode in upper passenger doors.

Once the door 1 has been opened in the emergency mode, a mechanical indicator will be visible on the spring 58 container indicating that the spring energy has been expended. Such an indicator may be a red painted square on the spring itself which is viewed through a window in the spring container or other suitable sensing system. When the spring 58 has been unwound, the sping 58 will move within the container and position the red square in front of the window. To restore the spring 58 energy, a lever on gear box 4 is set to the activated position and when the door is closed with the electric motor, the spring is rewound and locked. When the door is closed, the lever on gear box 4 (which can be hand crank) is stowed and the mechanical indicator on the spring container, in this case a green square painted on the spring at a location which can be observed through the window when the spring is wound, indicates that emergency mode spring energy is again available.

Like the upper doors, electrical sensors are used to indicate that the door is closed, locked, armed, and so on. In addition to the mechanical indicator described above, an electrical sensor is also provided which indicates that spring 58 energy is available or has been expended.

A release mechanism is-provided at the motor 3 engagement point which will permit the motor 3 to be de-clutched from the drive drum 5. This will allow the door 1 to be moved manually into the door jam opening, However, since the torque tube 54 cannot be rotated, it is not capable of moving the push rods 55 to activate the locking mechanism, and thus locking is not possible. This feature of the invention is provided for maintenance purposes when no electrical power is available. However, the door 1 opening mechanism is provided with a position for insertion of a hand crank into the drive drum 5 which will allow the entire system to be driven by hand and permits the torque tube 54 to be rotated manually to lock or unlock the door 1 as required.

Finally a side console 59 is usually present and is provided with a flipper door 63 which is manually flipped open and away from the bulkhead to accommodate the translation of the door 1 behind the console 59 along the bulkhead of the aircraft when opened.

Having thus described the invention what is claimed is:

1. A door operating system for opening and closing a door of an aircraft, wherein said door operating system comprises:
   a frame connected to upper portions of said door;
   a door opening and closing apparatus operably mounted to said door for opening said door by rotating the door about a pivot point defined by said frame such that the bottom of said door is moved inwardly and upwardly away from an exit opening in said aircraft and closing said door by rotating the door about said pivot point defined by said frame such that said bottom of said door is moved downwardly and outwardly toward said exit opening in said aircraft; and
   a door moving apparatus mounted adjacent to said exit opening in said aircraft, wherein said door moving apparatus is operably connected to said door for moving the door lengthwise with respect to said aircraft towards and away from said exit opening to close and open said door.

2. A door operating system as described in claim 1, wherein said door operating system further comprises a selectable driving apparatus for driving said door opening and closing apparatus and said door moving apparatus in a plurality of driving modes.

3. A door operating system as described in claim 2, wherein said plurality of driving modes is selected from a group consisting of an electromotive device, a mechanical driving mechanism, and manual force device.

4. A door operating system as described in claim 3, wherein said mechanical driving mechanism comprises an energy storage device for driving said door opening and closing apparatus and said door moving apparatus.

5. A door operating system as described in claim 4, wherein said energy storage device comprises a spring.

6. A door operating system as described in claim 3, wherein said manual force device comprises a crank arm for manually driving said door opening and closing apparatus and said door moving apparatus.

7. A door operating system as described in claim 3, wherein said electromotive device comprises an electric motor for driving said door opening and closing apparatus and said door moving apparatus.

8. A door operating system as described in claim 2, wherein said door moving apparatus further comprises:
   a track for transporting said door lengthwise with respect to said aircraft, wherein said track is operably mounted adjacent to said exit opening in said aircraft and slidably receives said frame;
   a cable drum connected to said driving apparatus; and
   a cable operably connected between said cable drum and said frame, wherein said driving apparatus turns said cable drum such that said cable moves said door lengthwise with respect to said aircraft away or towards said exit opening in said aircraft.

9. A door operating system as described in claim 1, further comprising a locking system connected to said door to unlocking and locking said door.

10. A door operating system comprising:
    a door adapted to fit an exit opening;
    a door opening and closing apparatus mounted adjacent said door and operably attached to said door for opening and closing said door; and a door moving apparatus mounted adjacent said exit opening operably attached to said door for moving the door towards and away from a door opening and closing position;

a selectable driving apparatus;

wherein said door opening and closing apparatus comprises:

a drive torque drum rotatably supported by said frame and adapted for selectively rotating said door toward and away from said exit opening to either a door opening or closing position;

an interlock mechanism which inhibits rotation of said drive torque drum until said door is moved to said door opening and closing positions;

and wherein said door moving apparatus comprises:

a track mounted adjacent to said exit opening;

a frame carried by said track, said frame attached to said door;

a cable drum mounted on said driving apparatus and adapted for rotation;

a cable operably connected between said cable drum, drive torque drum, and said frame.

11. A door operating system for opening and closing a door of an aircraft, wherein the door is adapted to rotate inward prior to being opened, and wherein said door operating system comprises:

an interlock mechanism which prevents movement of said door lengthwise with respect to said aircraft away from an exit opening until the door has been rotated inward;

a frame operably connected to said door;

a track for transporting said door lengthwise with respect to said aircraft, wherein said track is operably mounted adjacent to said exit opening in said aircraft and slidably receives said frame;

a driving apparatus mounted to one end of said track;

a cable drum mounted on said driving apparatus and adapted for rotation with respect thereto; and a cable operably connected between said cable drum and said frame, wherein said driving apparatus turns said cable drum such that said cable moves said door lengthwise with respect to said aircraft away or towards said exit opening in said aircraft once the door has been rotated inwardly and lengthwise and movement is permitted by said interlock mechanism.

12. A door operating system for opening and closing a door of an aircraft, wherein said door operating system comprises:

a plug door;

a frame attached to said door;

a track mounted spaced apart from an exit opening in said aircraft for slidably receiving said frame;

a motor mounted to one end of said track;

a cable drum mounted on said motor and adapted for rotation with respect thereto;

a carriage slidably received by said track;

an elongated tube rotatable connected to said carriage;

at least one frame portion mounted on said elongated tube;

a drive torque drum rotatably supported by said frame portion at least one linking apparatus having opposed ends, wherein one end is rotatably attached to said frame portion and said opposed end is rotatably connected to said door and adapted to permit movement of said door; and a cable operably connected between said cable drum, drive torque drum, and said carriage.

13. A door operating system as described in claim 12, wherein said door operating system further comprises a locking system having at least one locking mechanism operably connected to said door for selectively engaging and disengaging stops located in the sides of the exit opening in said aircraft thereby setting said door in either a locked or unlocked state.

14. A door operating system as described in claim 13, wherein said locking system comprises a torque tube connected between said drive torque drum and said locking mechanism:

for rotatably supporting said door such that said drive torque drum selectively rotates said torque tube to position said locking mechanism to engage and disengage said stops located in the sides of the exit opening in said aircraft thereby setting said door in either a locked or unlocked state.

15. A door operating system as described in claim, 14 wherein said locking system comprises:

a plurality of locking systems;

a torque tube connected to said drive torque drum; and a plurality of push rods connected between said torque tube and said locking systems, such that said drive torque drum selectively rotates said torque tube so as to move said push rods to position said plurality of locking mechanisms to engage and disengage said stops located in the sides of the exit opening in said aircraft thereby setting said door in either a locked or unlocked state.

16. A door operating system as described in claim 12, wherein said linking apparatus comprises:

a drive torque drum crank arm having opposed ends wherein one end is fixedly attached to said drive torque drum;

an interconnect link having first and second ends, wherein said first end is rotatably attached to said opposed end of said drive torque drum crank arm;

a door link having first and second ends, wherein said first end is rotatable connected to said second end of said interconnect link;

a door articulated linkage having first and second ends, wherein said first end is rotatably attached to said second end of said door link and said second end is rotatably attached to said door; and at least one spring loaded coupling having opposed ends, wherein one end is rotatably attached to said first end of said interconnect link and said opposed end is rotatable attached to said second end of said door link.

17. A door operating system as described in claim 16, wherein said articulated door link comprises first, second, and third swivel links all having opposed ends, wherein said swivel links are rotatably connected in series, and wherein one end of said first swivel link is rotatably connected to said second end of said door link and one end of said third swivel link is rotatably connected to said door such that when said drive torque drum is rotated in one direction said swivel links rotate said door toward said exit opening and when said drive torque drum is rotated in an opposite direction said swivel links rotate said door away from said exit opening.

18. A method for opening and closing a door covering an exit opening in an aircraft, wherein said method comprises the steps of:

unlatching said door;

rotating the door about a pivot point of a frame connected to the upper portion of said door such that said bottom of said door is rotated inwardly and upwardly away from said exit opening;

translating said door lengthwise with respect to said aircraft to a storage position away from said opening after said opening means has opened said door;

translating said door lengthwise with respect to said aircraft from said storage position to a closing position;

closing said door after said translating means has positioned said door to a closing position by rotating said door about said pivot point of said frame connected to the upper portion of said door such that said bottom of said door is moved downwardly and outwardly towards said exit opening; and latching said door.

19. A method according to claim 18, further comprising the step of blocking said step of translating said door lengthwise with respect to said aircraft until said bottom of said door has been rotated inwardly and upwardly.

20. A door operating system for opening and closing a door covering an opening in an aircraft by rotating said door upwardly and inwardly, wherein said door operating system comprises:

a driving apparatus;

a carriage mounted adjacent to said opening in said aircraft;

an elongated tube rotatably connected to said carriage, wherein said elongated tube defines a pivot point for rotation of the door;

at least one frame portion mounted on said elongated tube and to said upper portion of said door;

a drive torque drum rotatably supported by said frame portion;

at least one linking apparatus having opposed ends, wherein one end is rotatably attached to said drive torque drum and said opposed end is rotatably connected to said door; and a cable operably connected between said drive torque drum and said driving apparatus, wherein said driving apparatus pulls said cable, and wherein said cable turns said drive torque drum such that said drive torque drum moves said frame and linking apparatus thereby rotating the door about said pivot point defined by said elongated tube such that the bottom of said door is rotated upward and inward away from said exit opening to open said door and said door is rotated downwardly and outwardly toward said exit opening to close said door.

21. A door operating system as described in claim 20, wherein said linking apparatus comprises:

a drive torque drum crank arm having opposed ends wherein one end is attached to said drive torque drum;

an interconnect link having first and second ends, wherein said first end is rotatably connected to said opposed end of said drive torque drum crank arm;

a door link having first and second ends, wherein said first end is rotatably connected to said second end of said interconnect link;

a door articulated linkage having first and second ends, wherein said first end is rotatably connected to said second end of said door link and said second end is rotatably connected to said door; and at least one spring loaded coupling having opposed ends, wherein one end is rotatably attached to said first end of said interconnect link and said opposed end is rotatably attached to said second end of said door link.

22. A door operating system as described in claim 21, wherein said door articulated linkage comprises first, second, and third swivel links all having opposed ends, wherein said swivel links are rotatably connected in series, and wherein one end of said first swivel link is rotatably connected to said second end of said door link and one end of said third swivel link is rotatably connected to said door such that when said drive torque drum is rotated in one direction swivel links rotate said door toward said exit opening and when said drive torque drum is rotated in an opposite direction said swivel links rotate said door away from said exit opening.

23. A door operating system as described in claim 20, wherein said frame portion comprises a triangular shaped frame having three corners, and wherein said first corner of said frame is rotatably connected to said elongated tube and said second corner is rotatably connected to said drive torque drum.

24. A door operating system as described in claim 23, further comprises a door mount, wherein said third corner of said frame portion is rotatably connected to said door mount.

25. A door operating system as described in claim 24, wherein said door mount comprises:

a crank arm having opposed ends wherein one end is rotatably connected to said third corner of said frame;

a base having opposed ends, wherein one end is rotatably connected to said opposed end of said crank arm and said opposed end is connected to said door; and a cylinder having opposed ends, wherein one end is connected to the opposed end of said base and said opposed end of said cylinder is connected to said drive torque drum, such that when said drive torque drum is rotated by said driving apparatus said cylinder moves said base such that said door is rotated either upward and inward away or downward and outward toward said exit opening in said aircraft.

* * * * *

UNITED STATES PATENT AND TRADEMARK OFFICE
CERTIFICATE OF CORRECTION

PATENT NO. : 6,109,563
DATED : August 29, 2000
INVENTOR(S) : Verhoeven et al.

It is certified that error appears in the above-identified patent and that said Letters Patent is hereby corrected as shown below:

Title page, [56] References Cited, U.S. PATENT DOCUMENTS, line 8, "Seig" should read --Sieg--.

Column 2, line 47, "FIG. 3a-3c" should read --FIGS. 3A-3C--.

Column 6, line 61, "to", second occurrence, should read --for--.

Column 7, line 2, after "opening" insert --and--; line 20, after "rotation;" insert --and--; line 57, "rotatable" should read --rotatably--.

Column 8, line 21, "claim, 14" should read --claim 14,--; line 44, "rotatable" should read --rotatably--; line 53, "rotatable" should read --rotatably--.

Signed and Sealed this

Twenty-ninth Day of May, 2001

*Attest:*

NICHOLAS P. GODICI

*Attesting Officer*     *Acting Director of the United States Patent and Trademark Office*